(12) United States Patent
Provine et al.

(10) Patent No.: US 7,319,699 B1
(45) Date of Patent: Jan. 15, 2008

(54) DISTRIBUTED IMPOSITION OF MULTI-LEVEL LABEL STACK USING LOCAL LABEL

(75) Inventors: Joseph Provine, San Jose, CA (US); Mark Szczesniak, Carlisle, MA (US)

(73) Assignee: Cisco Technology, Inc., San Jose, CA (US)

( * ) Notice: Subject to any disclaimer, the term of this patent is extended or adjusted under 35 U.S.C. 154(b) by 1067 days.

(21) Appl. No.: 10/346,426

(22) Filed: Jan. 17, 2003

(51) Int. Cl.
*H04L 12/28* (2006.01)
*H04L 12/54* (2006.01)

(52) U.S. Cl. .................................. 370/395.3; 370/428

(58) Field of Classification Search ..................... None
See application file for complete search history.

(56) References Cited

U.S. PATENT DOCUMENTS

| | | | |
|---|---|---|---|
| 5,020,052 A | 5/1991 | DePrycker et al. ........... 370/60 |
| 2002/0093954 A1* | 7/2002 | Weil et al. .................. 370/389 |
| 2002/0110122 A1* | 8/2002 | Ramfelt et al. ............. 370/389 |
| 2002/0172155 A1* | 11/2002 | Kasvand-Harris et al. .. 370/229 |
| 2003/0110287 A1* | 6/2003 | Mattson ...................... 709/238 |
| 2003/0161264 A1* | 8/2003 | Ho et al. .................... 370/229 |
| 2003/0174706 A1* | 9/2003 | Shankar et al. ............. 370/393 |
| 2004/0017816 A1* | 1/2004 | Ishwar et al. .......... 370/395.53 |
| 2004/0202171 A1* | 10/2004 | Hama ...................... 370/395.1 |
| 2005/0220072 A1* | 10/2005 | Boustead et al. ........... 370/351 |

OTHER PUBLICATIONS

Welcher, Peter J., New Cisco MPLS Features, Jul. 9, 2002, pp. 1-6.*
Cisco, "Cisco Any Transport over MPLS", Aug. 2002, pp. 1-5.*
Ghanwani, Anoop et al., Traffic Engineering Standards in IP networks using MPLS, Dec. 1999, pp. 1-8.*
Braden, et al., "Resource ReSerVation Protocol (RSVP)-Version 1 Functional Specification," RFC 2205, Internet Engineering Task Force, Sep. 1997.
E. Rosen, et al., "BGP/MPLS VPNs," RFC 2547, Internet Engineering Task Force, Mar. 1999.
Awduche, et al., "Requirements for Traffic Engineering Over MPLS," RFC 2702, Internet Engineering Task Force, Sep. 1999.
E. Rosen et al., "Multiprotocol Label Switching Architecture," RFC 3031, Internet Engineering Task Force, Jan. 2001.
Awduche et al., "RSVP-TE: Extensions to RSVP for LSP Tunnels," RFC 3209, Internet Engineering Task Force, Dec. 2001.
Ashwood-Smith et al., "Generalized MPLS Signaling—RSVP-TE Extensions," Internet Draft, Internet Engineering Task Force, Oct. 2001.
Pan, et al., "Fast Reroute Techniques in RSVP-TE," Internet Draft, Internet Engineering Task Force, Nov. 2001.
L. Martini et al., "Encapsulation Methods fro Transport of PPP/HDLC Frames Over IP and MPLS Networks," Internet Draft, Internet Engineering Task Force, Apr. 2002.
L. Martini et al., "Encapsulation Method for Transport of ATM Cells/Frame Over IP and MPLS Networks," Internet Draft, Internet Engineering Task Force, Jun. 2002.
C. Kawa et al., "Frame Relay Encapsulation Over Pseudo-Wires," Internet Draft, Internet Engineering Task Force, Jun. 2002.
L. Martini, et al., "Encapsulation Methods for Transport of Ethernet Frames Over IP and MPLS Networks," Internet Draft, Internet Engineering Task Force, Jul. 2002.

(Continued)

*Primary Examiner*—Kwang Bin Yao
*Assistant Examiner*—Vaibhav (Manu) Sawhney
(74) *Attorney, Agent, or Firm*—Cindy Kaplan

(57) ABSTRACT

Improved scalability and performance for label switched routers are provided. Large numbers of interfaces may be readily accommodated. In one implementation, label imposition is divided between ingress and egress linecards so that the interface supporting a given service can be the one to impose any needed corresponding label.

16 Claims, 5 Drawing Sheets

OTHER PUBLICATIONS

L. Martini, et al., "Transport of Layer 2 Frames Over MPLS," Internet Draft, Internet Engineering Task Force, Aug. 2002.

L. Martini, et al., "Encapsulation Methods for Transport of ATM Cells/Frame Over IP and MPLS Networks," Internet Draft, Internet Engineering Task Force, Oct. 2002.

L. Martini, et al., "Frame Relay Over Pseudo-Wires," Internet Draft, Internet Engineering Task Force, Oct. 2002.

L. Martini, et al. "Transport of Layer 2 Frames Over MPLS," Internet Draft, Internet Engineering Task Force, Nov. 2002.

L. Martini, et al., "Encapsulation Methods for Transport of Ethernet Frames Over IP/MPLS Networks," Internet Draft, Internet Engineering Task Force, Nov. 2002.

* cited by examiner

DISTRIBUTED IMPOSITION OF MULTI-LEVEL LABEL STACK USING LOCAL LABEL

BACKGROUND OF THE INVENTION

The present invention relates to data networking and, in certain embodiments, to label switching techniques.

Multiprotocol label switching (MPLS) is a network routing technique that operates by appending one or more labels to packets flowing through a network. As the packet encounters successive hops in the network, the label is used to select a next hop and a substitute label. The forwarding mechanism thus consists of a look-up of the incoming label in a table and extraction of the appropriate next hop and substitute label from the table entry. The routing control mechanism essentially consists of appropriately populating such tables in the various nodes in a network.

MPLS supports a very diverse set of services with disparate ways of distributing and selecting labels to accomplish particular objectives. For example, MPLS Traffic Engineering exploits label switching techniques to provide guaranteed bandwidth end-to-end circuits across a network. MPLS can also be used to construct virtual private networks (VPNs) via an IP mesh network. Also, Frame Relay, ATM, or Any Transport over MPLS (AToM) virtual circuits (VCs) may be readily implemented using MPLS. Yet another MPLS service is so-called Fast Reroute (FRR) which can create temporary tunnels around failed links or nodes.

Two or more of these MPLS service scenarios may operate simultaneously at a given point in the network. For example, a service provider may offer a VPN service to a customer having widely separated locations. The service provider's core network is used to link together the locations. VPN traffic between a particular pair of customer locations may flow through one or more MPLS traffic engineering tunnels. Along the way, however, a link or node may fail necessitating the use of MPLS FRR. Each such service will add to the number of labels a packet is carrying. For example, a node that represents the beginning of a traffic engineering tunnel will add a label that will be used to guide the packet to the peer at the other end of the tunnel. That peer will drop the traffic engineering label prior to further forwarding, but other labels may remain. For example, further forwarding after the traffic engineering tunnel may be based on labels distributed to facilitate forwarding within a virtual private network. Thus, instead of a single label, each packet is said to have a label stack with the number of labels varying as the packet traverses nodes which may impose labels, dispose (drop or "pop") labels, or replace labels. Each node will manipulate one or more of the topmost labels of the label stack while lower level label(s) may remain undisturbed.

A router that incorporates MPLS functionality is referred to as a label switched router (LSR). The LSR typically includes multiple interfaces. A packet traversing the LSR will arrive at an ingress interface. Based on a routing decision made at the ingress interface, an egress interface is selected and the packet is transferred there before being output by the LSR. Accordingly, label forwarding tables are maintained on the ingress interface since that is where an initial decision on the packet's disposition must be taken. A look-up of the packet's incoming label, IP destination address, or other relevant identifier, selection of a next hop and output interface, and label imposition, disposition, and/or replacement all occur on the ingress interface.

It is now desirable to deploy LSRs having very large number of interfaces for use at the edge of service provider networks. A relatively large number of these interfaces, referred to as customer-facing interfaces, will be connected to customer networks while a smaller number, referred to as core-facing interfaces, are connected to the service provider core network. Problems of both scalability and performance, however, arise in performing all label manipulations on the ingress interface, which depending on the direction of the packet may either be the customer-facing interface or the core-facing interface.

Consider, for example, the use of MPLS Traffic Engineering tunnels to carrying customer Layer 2 VPN traffic through a core network. A single provider edge router is connects the core network to a very large number of interfaces to customer VPNs. Whenever a traffic engineering tunnel is added, reconfigured, etc., there will be a change in the label imposed at the edge LSR starting the tunnel. A given tunnel will typically be managed and configured at one of the core-facing interfaces of the edge router or on the linecard including that core-facing interface. However, control plane operations to add, modify, or delete a tunnel may require changes to forwarding tables for numerous core-facing interfaces. Such reconfiguration thus can happen only very slowly. Furthermore, there is a very large amount of label information relating to tunnels that must be stored on each of the numerous customer-facing interfaces.

The Layer 2 VPNs will be managed on the customer-facing interfaces/linecards. But for packets exiting the service provider network, the core-facing interfaces will be the ingress interfaces responsible for label manipulations. Thus each core-facing linecard will have to maintain label information for a potentially very large number of VPNs. Because of the need to handle label manipulations for packets exiting the core network, the core-facing linecards may also have to store label forwarding tables for services such as Layer 3 VPN, AToM, etc. This again impacts scalability.

What is needed are systems and methods for operating label switched routers that can readily accommodate large numbers of interfaces without compromising performance.

SUMMARY OF THE INVENTION

Embodiments of the present invention provide improved scalability and performance to label switched routers and can readily accommodate large numbers of interfaces. In one implementation, label imposition is divided between ingress and egress linecards so that the interface supporting a given service can be the one to impose any needed corresponding label.

One aspect of the present invention provides a method for operating a label switched router (LSR). The method includes: at a first linecard within the label switched router receiving a packet; at the first linecard, imposing a first label on the packet; at the first linecard, assigning a second linecard within the label switched router for output of the packet; transferring the packet from the first linecard to the second linecard; at the second linecard, imposing a second label on the packet; and, at the second linecard, outputting the packet with the first label and the second label.

Further understanding of the nature and advantages of the inventions herein may be realized by reference to the remaining portions of the specification and the attached drawings.

DESCRIPTION OF SPECIFIC EMBODIMENTS

The present invention will be described with reference to an exemplary label switched router (LSR) in a representative network. The present invention, however, can be applied to a wide variety of network devices and network configurations.

Figure 1:
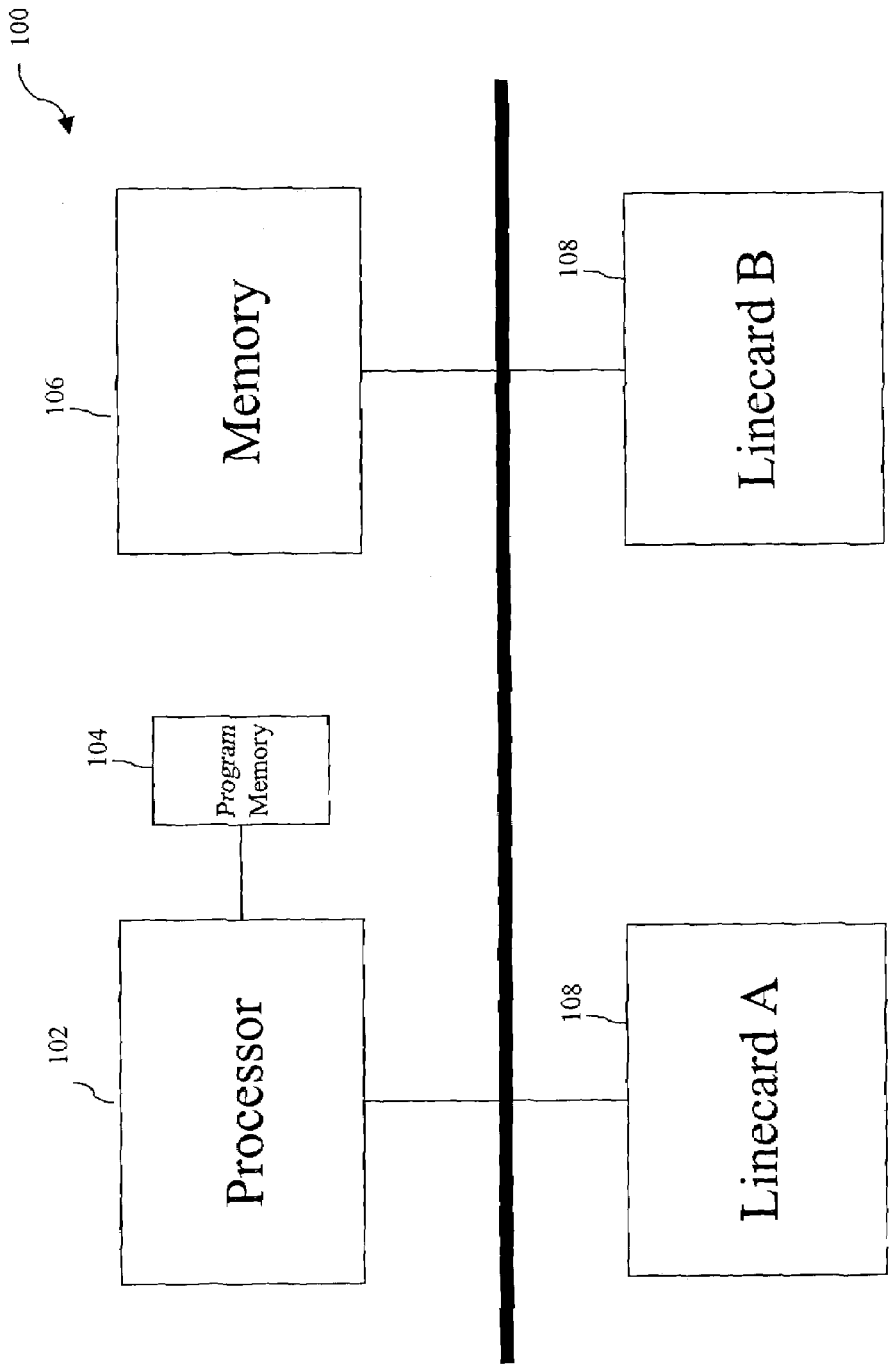
FIG. 1 depicts a label switched router according to one embodiment of the present invention.

FIG. 1 depicts a network device 100 that may be used to implement embodiments of the present invention. Network device 100 includes a central processor 102 that executes codes stored in a program memory 104. Program memory 104 is one example of a computer-readable storage medium. Program memory 104 can be a volatile memory. Another form of computer-readable storage medium storing the same codes would be some type of non-volatile storage such as floppy disks, CD-ROMs, DVD-ROMs, hard disks, flash memory, etc. A packet memory 106 is also provided for intermediate storage of packets. Network device 100 interfaces with physical media via a plurality of linecards 108. Although only two linecards 108 are shown, it is understood that there may be numerous linecards within network device 100. It will also be appreciated that each linecard 108 may include numerous separate physical interfaces. For example, a particular linecard may include a large number of electrical and/or optical interfaces. Such interfaces include, but are not limited to, e.g., Ethernet interfaces, Gigabit Ethernet interfaces, DS-1, DS-3 interfaces, Frame Relay interfaces, ATM interfaces, SONET interfaces, dial-up interfaces, DSL interfaces, wireless interfaces, etc. The various components are interconnected by a backplane.

Figure 2:
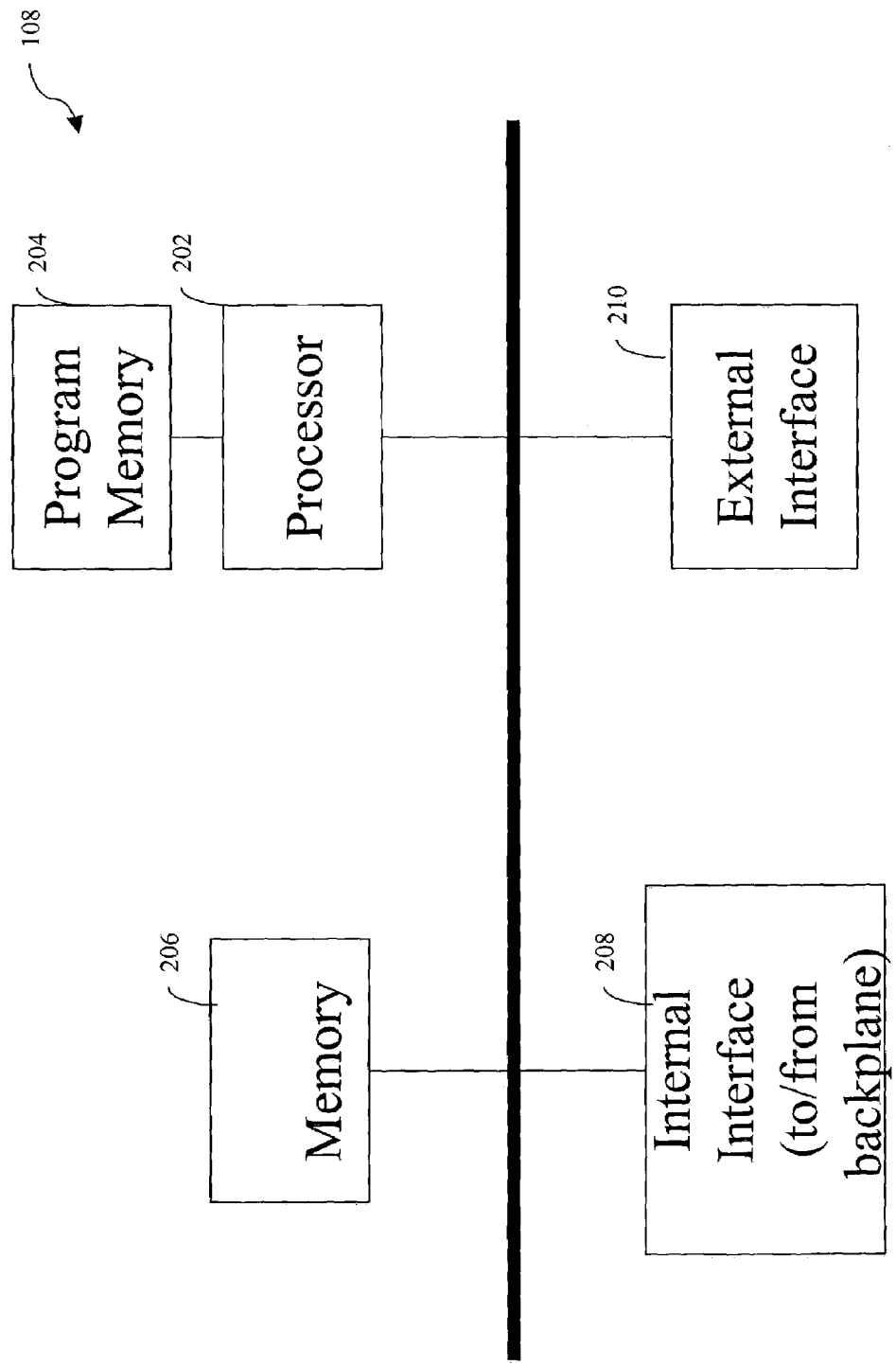
FIG. 2 depicts a particular linecard of the label switched router of FIG. 1 according to one embodiment of the present invention.

FIG. 2 depicts structure of one of the linecards 108 according to one embodiment of the present invention. Linecard 108 includes a processor 202 to perform operations specified by aspects of the present invention. Like processor 102, processor 202 may execute instruction stored in a program memory 204. Program memory 204 may represent any of the computer-readable storage medium types described in reference to memory 104 and instructions for processor 202 may be stored on any type of volatile or fixed computer-readable storage medium as referred to above. A packet memory 206 provides intermediate storage of packets internally within linecard 108. Linecard 108 includes an internal interface 208 to backplane 112 of network device 100 and also includes an external interface 210 to provide connectivity outside network device 100. Although only one external interface 210 is depicted, it is understood that a single linecard 108 may include numerous such external interfaces. The precise structure of external interface 210 will of course depend on the particular type of network, transmission medium, etc. to which it is connected.

Figure 3:
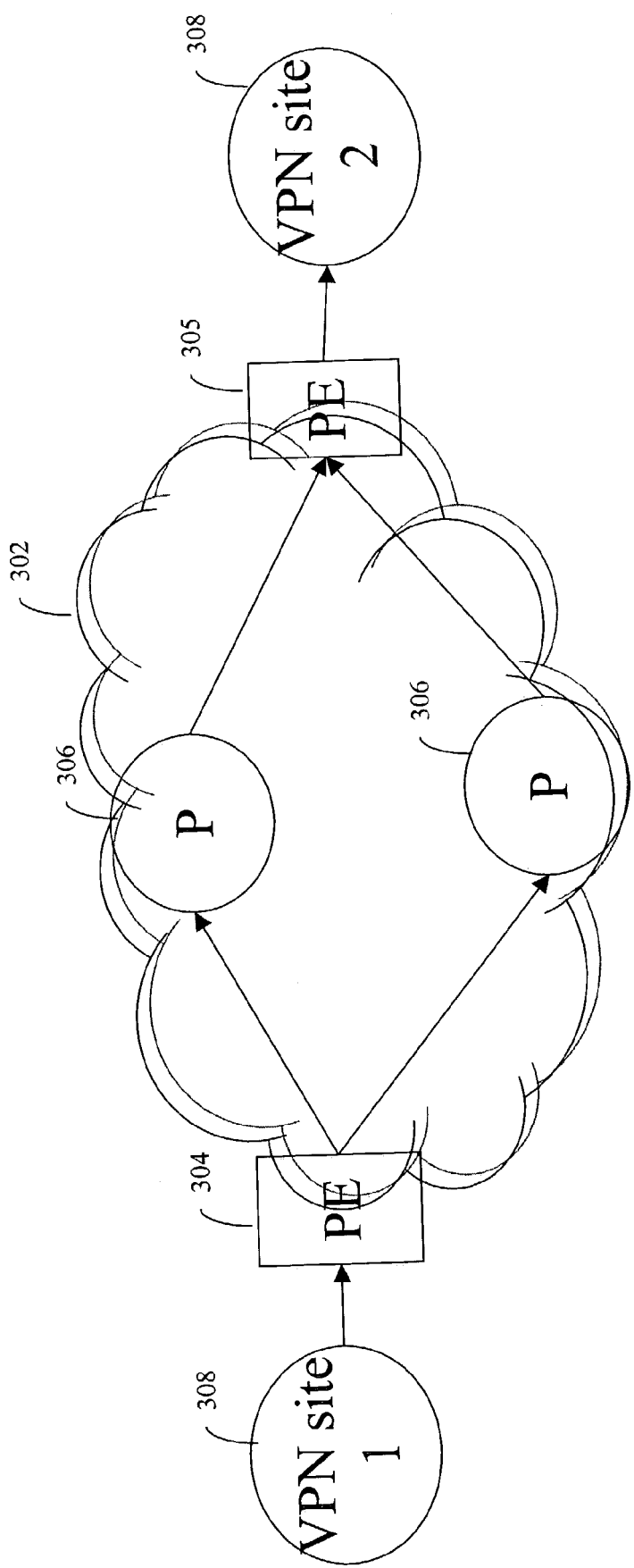
FIG. 3 depicts a network environment to which embodiments of the present invention may be applied.

FIG. 3 depicts a representative network environment to which embodiments of the present invention may be applied. The network environment is illustrated in simplified form for clarity of depiction. A service provider network 302 is represented by a network cloud. At the edge of service provider network 302 are found provider edge routers 304 and 305 used to interface to customer networks. Within service provider network 302, connectivity is provided via a series of service provider routers 306. Two such service provider routers 306 are depicted here to illustrate the possibility of multiple paths between the two provider edge routers 304 and 305. It will, of course, be understood that the actual structure of service provider network 302 is likely to be far more complex than what is illustrated. There will be a large number of provider edge routers, many possible paths between them and many of these paths will include multiple hops.

Each provider edge router will of course include multiple linecards that will be connected to customer sites and networks and thus will be considered to be "customer-facing" linecards. Other linecards will provide connectivity to the core network and will thus be considered to be "core-facing" linecards. For a packet entering the service provider network from a customer site or network, the customer-facing linecard through which it enters the provider edge router is the ingress linecard while the core-facing linecard through with it exits is the egress linecard. Similarly, for a packet exiting the service provider network to the customer site network, the employed core-facing linecard is the ingress linecard while the customer-facing linecard is the egress linecard.

In FIG. 3 service provider network 302 provides virtual private network connectivity between two customer VPN sites 308. In one embodiment, service provider network 302 operates as an MPLS Traffic Engineering network. The customer VPN is a supported service. The service provider network 302, including provider edge routers 304 and 305 and provider routers 306, makes use of MPLS, MPLS Traffic Engineering, and MPLS-based layer 2 or layer 3 VPNs. Service provider network 302 may also employ MPLS Fast Reroute (FRR) to repair around failed links or nodes. Other supported services may include Frame Relay, ATM, AToM, etc. Thus there may be a wide variety of MPLS-based services.

To support these MPLS-based services, provider edge routers 304 and 305 and provider routers 306 may operate in accordance with protocols specified by the following documents, the contents of which are herein incorporated by reference in their entirety:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Ashwood-Smith, et al., "Generalized MPLS Signaling—RSVP-TE Extensions," Internet Draft, Internet Engineering Task Force, October 2001.

Pan, et al., "Fast Reroute Techniques in RSVP-TE," Internet Draft, Internet Engineering Task Force, October 2001.

Awduche, et al., "RSVP-TE: Extensions to RSVP for LSP Tunnels," RFC 3209, Internet Engineering Task Force, December 2001.

E. Rosen, et al., "BGP/MPLS VPNs," RFC 2547, Internet Engineering Task Force, March 1999.

L. Martini, et al., "Transport of Layer 2 Frames Over MPLS," Internet Draft, Internet Engineering Task Force, August 2002.

C. Kawa, et al., "Frame Relay Encapsulation Over Psuedo-Wires," Internet Draft, Internet Engineering Task Force, June 2002.

L. Martini, et al., "Transport of Layer 2 Frames Over MPLS," Internet Draft, Internet Engineering Task Force, November 2002.

L. Martini, et al., "Encapsulation Methods for Transport of Ethernet Frames Over IP/MPLS Networks," Internet Draft, Internet Engineering Task Force, November 2002.

L. Martini, et al., "Frame Relay Over Psuedo-Wires," Internet Draft, Internet Engineering Task Force, October 2002.

L. Martini, et al., "Encapsulation Methods for Transport of ATM Cells/Frame Over IP and MPLS Networks," Internet Draft, Internet Engineering Task Force, October 2002.

L. Martini, et al., "Encapsulation Methods for Transport of PPP/HDLC Frames Over IP and MPLS Networks," Internet Draft, Internet Engineering Task Force, April 2002.

L. Martini et al., "Encapsulation Methods for Transport of ATM Cells/Frame Over IP and MPLS Networks," Internet Draft, Internet Engineering Task Force, June 2002.

L. Martini et al., "Encapsulation Methods for Transport of Ethernet Frames Over IP and MPLS Networks," Internet Draft, Internet Engineering Task Force, July 2002.

It will be appreciated then that provider edge routers 304 and provider routers 306 are label switched routers (LSRs). A general familiarity with the protocols described in the above documents will be assumed for the discussion that follows.

Each of the services mentioned may be supported by a particular label in the label stack of a packet traversing service provider network 302. Within provider edge routers 304, services relating to the customer network will typically be managed from customer-facing linecards while services relating to core network operation will be managed from the linecards facing the core network. Examples of customer network services include VPN (layer 2 or layer 3), Frame Relay, ATM Virtual Circuits, AToM Virtual Circuits, etc. Examples of core network services include Traffic Engineering tunnels, Fast Reroute tunnels, LDP-based label switched paths (LSPs), etc.

For each operative label-supported service, the routers in service provider network 302 will impose, dispose, or replace a label. In the prior art, this was typically done at the ingress interface of the router. However, according to embodiments of the present invention, scalability and performance are improved by distributing label manipulations between the ingress and egress linecards. Label processing for customer-related services occurs on the customer-facing interface while label processing for core network-related services occurs on the core-facing interface regardless of which direction the packet traverses the router.

Figure 4A:
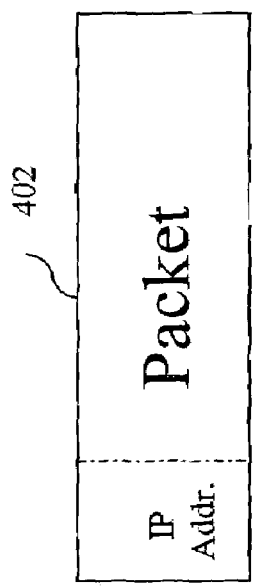
FIGS. 4A-4C depict label stacks useful in illustrating embodiments of the present invention.
Figure 4B:
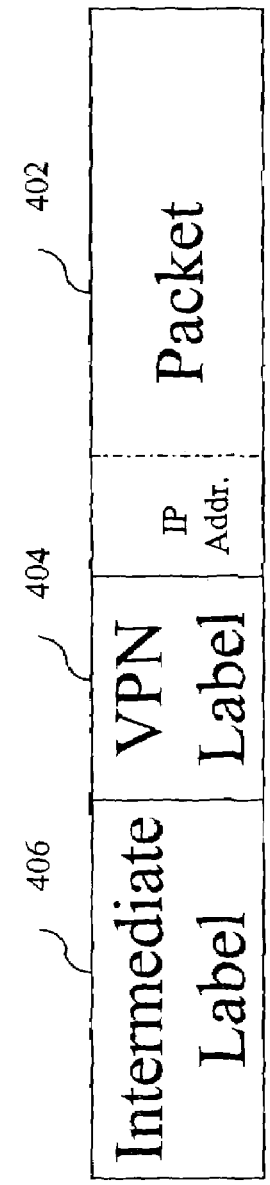
Figure 4C:
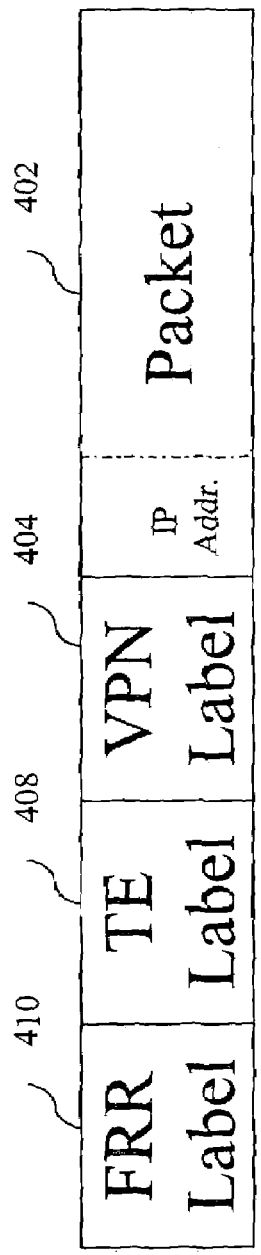

To facilitate this type of operation, the ingress interface may also impose a local label that the egress interface can then use as a look-up key for labels that it will impose. FIGS. 4A-4C depict label stacks as would be used as a packet traverses one of provider edge routers 304 into service provider network 302. The leftmost labels correspond to the top of the label stack. Typically, lower level labels are imposed on the customer-facing linecard while higher level labels are imposed on the core-facing linecard.

A packet 402, as shown in FIG. 4A arrives from VPN site 1 308 with an IP destination address and/or a VPN label. At an ingress linecard 108 within provider edge router 304, a VPN label 404 is imposed. This label will be used at provider edge router 305 to direct the packet to a next hop in VPN site 2 308. An intermediate local label 406 is also imposed as a forwarding search key for use by the egress linecard 108. These impositions result in the packet of FIG. 4B.

Then at the core-facing line card, the intermediate label 406 is replaced by a MPLS Traffic Engineering label 408. In the depicted example, provider edge router 304 also represents a point of local repair for a failed link or node at the beginning of the Traffic Engineering tunnel. Accordingly, a Fast Reroute label 410 is also imposed to direct the packet around the failed element and back into the established Traffic Engineering tunnel. The result is the packet of FIG. 4C. Of course, with additional services such as Frame Relay, etc., there may be additional layers of labeling or other services may substitute for the ones depicted.

Figure 5:
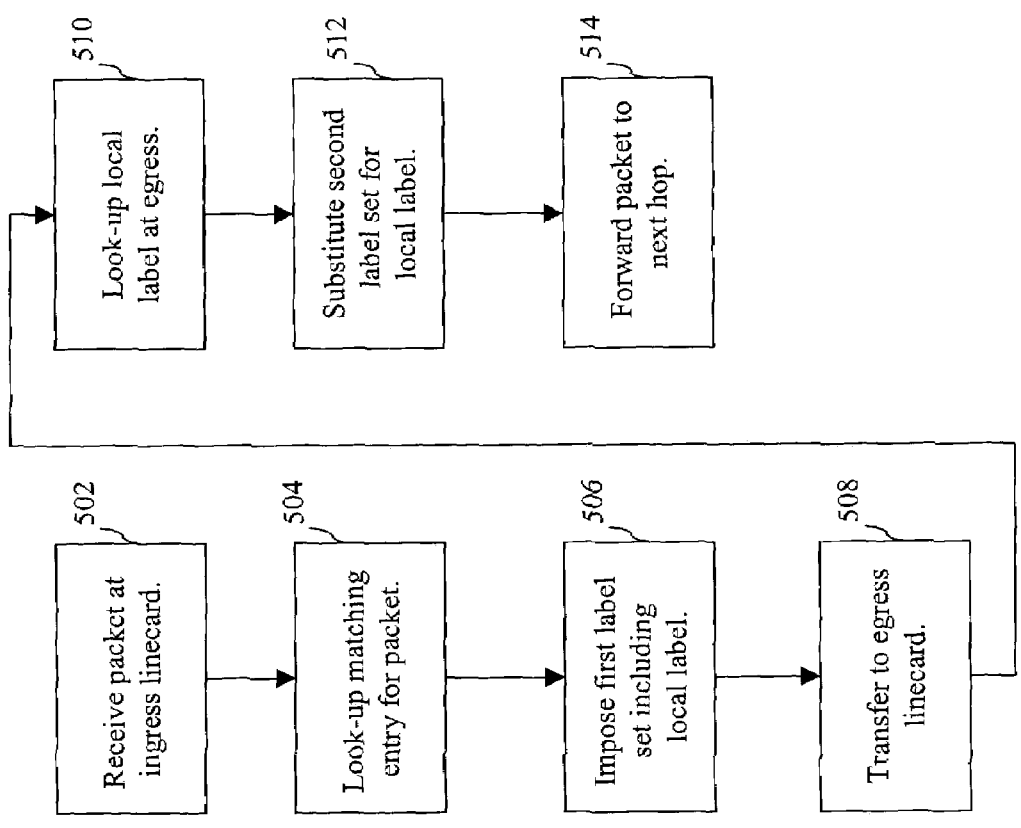
FIG. 5 is a flow chart describing steps of operating a label switched router according to one embodiment of the present invention.

The packet handling process will now be described with reference to FIG. 5. FIG. 5 is a flow chart depicting steps of handling a packet received at a label switched router such as provider edge router 304 according to one embodiment of the present invention. At step 502, a packet is received at an ingress linecard of the provider edge router 304. It will be understood that where the term "packet" is referred to in this document, it includes data block such as frames, cells, etc.

At step 504, the ingress linecard finds a match in a local forwarding table for the packet. If the incoming packet is an IP packet, the well-known longest match technique may be applied to the packet's destination IP address to select a matching entry in the table. The look-up is then essentially based on the so-called forwarding equivalence class (FEC) of the packet. Alternatively, the packet has a previously imposed label that is used as a search key for the look-up. The incoming "packet" may also be a non-IP data unit such as Ethernet frame, ATM cell, Frame Relay frame, etc. In that case, the appropriate identifier, e.g., virtual circuit identifier, MAC layer address, etc., may be used as the search key for look-up if there is no affixed label.

The result of the look-up determines the label manipulation to be performed on the packet. The label manipulation may involve imposing a first set of one or more labels including a label for every MPLS-based service supported on the ingress linecard (if there are any) and a local label to be used as a forwarding search key on the egress linecard. This first set may replace one or more labels of the received packet. The label manipulation can alternatively involve simply dropping one or more labels. The look-up also results in a selection of an egress interface.

In step 506, the label manipulation identified by the look-up operation is performed. For example, a first label set identified by the look-up is imposed on the received packet. Then at step 508, the packet, encapsulated with this first label set is transferred via backplane 112 to the egress linecard that includes the egress interface identified by the retrieved table entry.

The egress linecard stores a forwarding table that is keyed by the local label. Each entry includes a second label set including labels corresponding to services supported on the egress linecard and a next-hop node. At step 510, a local label imposed by the ingress linecard is used as a key to this table. At step 512, the second label set is substituted for the local label. Then at step 514, the packet is forwarded to the next hop encapsulated with a label stack that includes both the first label set and the second label set. Such a concatenated label stack is shown in FIG. 4C.

In the control plane, label distribution operations will occur normally among routers as specified by the relevant operative protocols. The local labels are typically allocated from the LSR's global label space and transmitted by use of LDP. Labels to support ATM virtual circuits are, however, allocated from interface-specific label spaces. In many situations, the local label may simply be the one that would have otherwise been advertised to the preceding LSR.

It will be appreciated then that changes in core network connectivity need not force modifications at numerous customer-facing interfaces. Conversely, customer-facing interfaces are insulated from configuration changes in services managed by core-facing interfaces. Forwarding information is instead maintained on the linecards where the services likely to change that forwarding information are managed. This facilitates the operation of large numbers of interfaces in the same router. The forwarding information kept on each linecard is also kept at a minimum, thus improving performance and scalability. Also, in the special case of layer 3 VPNs where virtual routing facilities (VRFs) are used to accommodate overlapping VPN address spaces, there are savings in that these may be maintained only on the relevant customer-facing line card and need not be replicated on each core-facing line card.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a label switched router (LSR), said method comprising:
    at a first linecard within said label switched router, receiving a packet;
    at said first linecard, imposing a first label on said packet;
    at said first linecard, assigning a second linecard within said label switched router for output of said packet;
    imposing an intermediate label on said packet;
    transferring said packet from said first linecard to said second linecard;
    at said second linecard, imposing a second label on said packet; and
    at said second linecard, outputting said packet with said first label and said second label;
    wherein imposing said second label on said packet comprises:
        based on said intermediate label, selecting said second label; and
        replacing said intermediate label with said second label.

2. The method of claim 1 wherein said first label comprises a label supporting a virtual private network.

3. The method of claim 1 wherein said first label comprises a label supporting an AToM virtual circuit.

4. The method of claim 1 wherein said second label comprises a label supporting a Traffic Engineering tunnel.

5. The method of claim 1 wherein said second label comprises a label supporting an LDP-based label switched path.

6. A computer-readable medium storing a computer program for operating a label switched router (LSR), said computer program comprising:
    code that, at a first linecard within said label switched router, receives a packet;
    code that, at said first linecard, imposes a first label on said packet;
    code that, at said first linecard, assigns a second linecard within said label switched router for output of said packet;
    code that imposes an intermediate label on said packet;
    code that transfers said packet from said first linecard to said second linecard;
    code that, at said second linecard, imposes a second label on said packet; and
    code that, at said second linecard, outputs said packet with said first label and said second label
    wherein said code that imposes said second label on said packet comprises:
        code that, based on said intermediate label, selects said second label; and
        code that replaces said intermediate label with said second label.

7. The computer-readable medium of claim 6 wherein said first label comprises a label supporting a virtual private network.

8. The computer-readable medium of claim 6 wherein said first label comprises a label supporting an AToM virtual circuit.

9. The computer-readable medium of claim 6 wherein said second label comprises a label supporting a Traffic Engineering tunnel.

10. The computer-readable medium of claim 6 wherein said second label comprises a label supporting an LDP-based label switched path.

11. Apparatus for operating a label switched router (LSR), said apparatus comprising:
    a first linecard within said label switched router that receives a packet, imposes a first label on said packet, assigns a second linecard within said label switched router for output of said packet, and transfers said packet to said second linecard; and
    a second linecard that imposes a second label on said packet and outputs said packet with said first label and said second label;
    wherein said first linecard, prior to transferring said packet from said first linecard to said second linecard, imposes an intermediate label on said packet, and wherein said second linecard imposes said second label on said packet by selecting said second label based on said intermediate label and replacing said intermediate label with said second label.

12. The apparatus of claim 11 wherein said first label comprises a label supporting a virtual private network.

13. The apparatus of claim 11 wherein said first label comprises a label supporting an AToM virtual circuit.

14. The apparatus of claim 11 wherein said second label comprises a label supporting a Traffic Engineering tunnel.

15. The apparatus of claim 11 wherein said second label comprises a label supporting an LDP-based label switched path.

16. Apparatus for operating a label switched router (LSR), said apparatus comprising:
    means for, at a first linecard within said label switched router, receiving a packet;
    means for, at said first linecard, imposing a first label on said packet;
    means for, at said first linecard, assigning a second linecard within said label switched router for output of said packet;
    means for imposing an intermediate label on said packet;
    means for transferring said packet from said first linecard to said second linecard;

means for, at said second linecard, imposing a second label on said packet; and means for, at said second linecard, outputting said packet with said first label and said second label wherein said means for imposing said second label on said packet comprises:

means for, based on said intermediate label, selecting said second label; and means for replacing said intermediate label with said second label.

* * * * *